July 31, 1923.
C. W. STOVER
METHOD OF FORGING INSULATOR CAPS
Filed Dec. 21, 1921     3 Sheets-Sheet 1
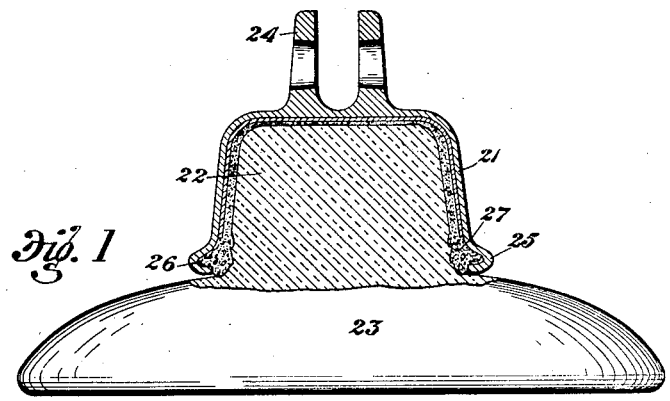
Fig. 1
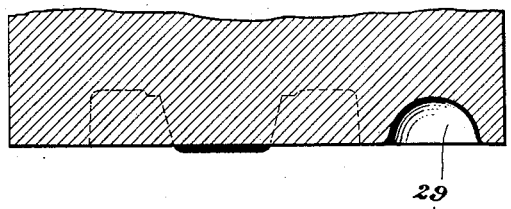
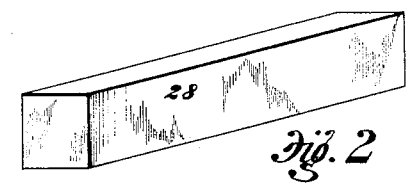
Fig. 2
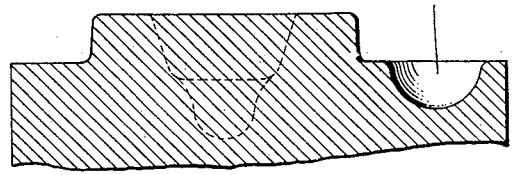
Fig. 3
Fig. 4
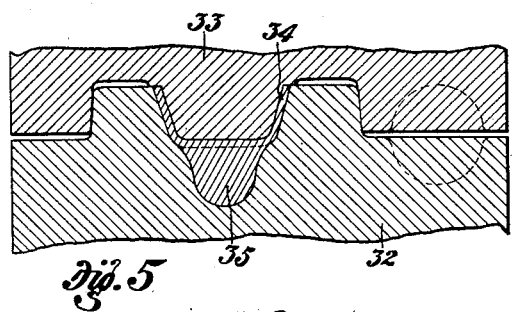
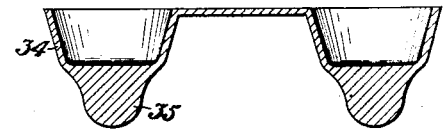
Fig. 5
Fig. 6
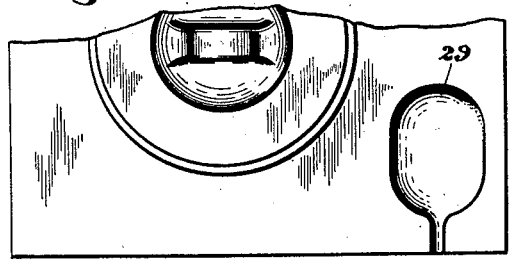
Fig. 7
Inventor
Clinton W. Stover
By Frease and Bond
Attorneys July 31, 1923.

C. W. STOVER

METHOD OF FORGING INSULATOR CAPS

Filed Dec. 21, 1921    3 Sheets-Sheet 2

Inventor
Clinton W. Stover
By Frease and Bond
Attorneys

Patented July 31, 1923.

1,463,601

UNITED STATES PATENT OFFICE.

CLINTON W. STOVER, OF CANTON, OHIO.

METHOD OF FORGING INSULATOR CAPS.

Application filed December 21, 1921. Serial No. 523,931.

*To all whom it may concern:*

Be it known that I, CLINTON W. STOVER, a citizen of the United States, residing at Canton, in the county of Stark and State of Ohio, have invented a new and useful Method of Forging Insulator Caps, of which the following is a specification.

The invention relates to metal insulator caps used for supporting high tension conductors, and the object of the improvement is to make the cap by a forging process as distinguished from a casting process.

Insulator caps are usually formed in the shape of an inverted cup, with one or more apertured ears on its top for a supporting connection, and with an internally recessed rim for engaging the cement which secures the head of the insulator within the cap.

The new method of making such an insulator cap involves the forging of a cup with an ear lug on its bottom and an offset flange on its rim; followed by indentures in the sides of the ear lug and a cutting of the same to form a pair of apertured ears, and the formation of a recessed rim from the flange by a bending or closing operation.

The several steps of the process are illustrated in the accompanying drawings, forming part hereof, in which—

Figure 8:
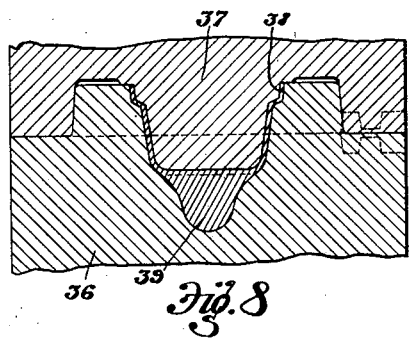
Figure 9:
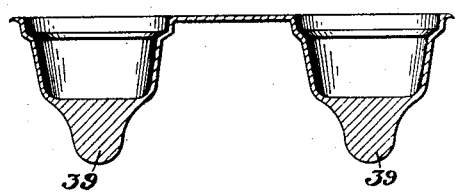
Figure 10:
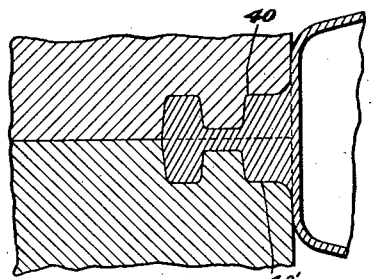
Figure 11:
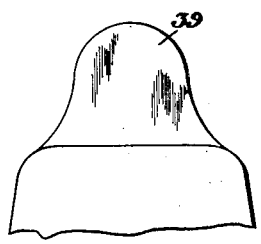
Figure 12:
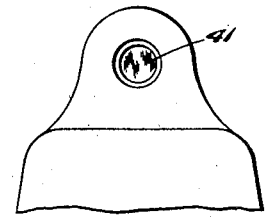
Figure 13:
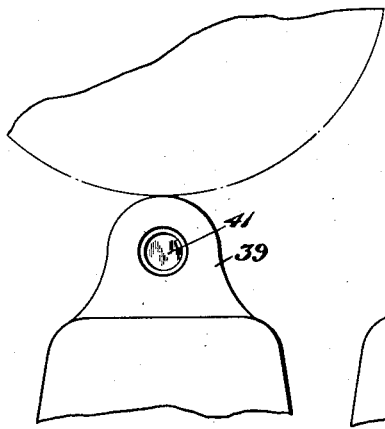
Figure 14:
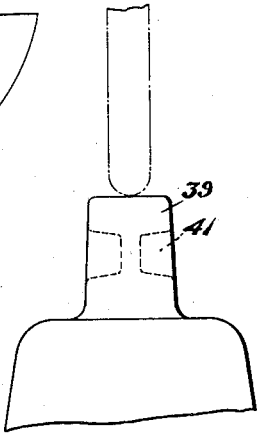
Figure 15:
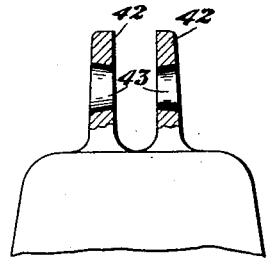
Figures 16, 17, 18:
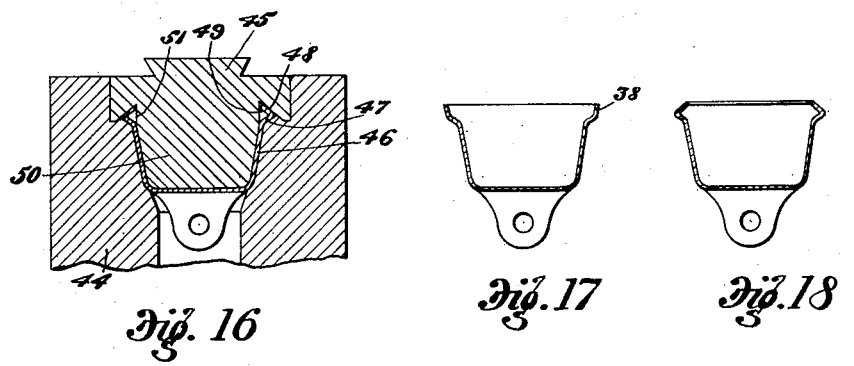
Figures 19, 20:
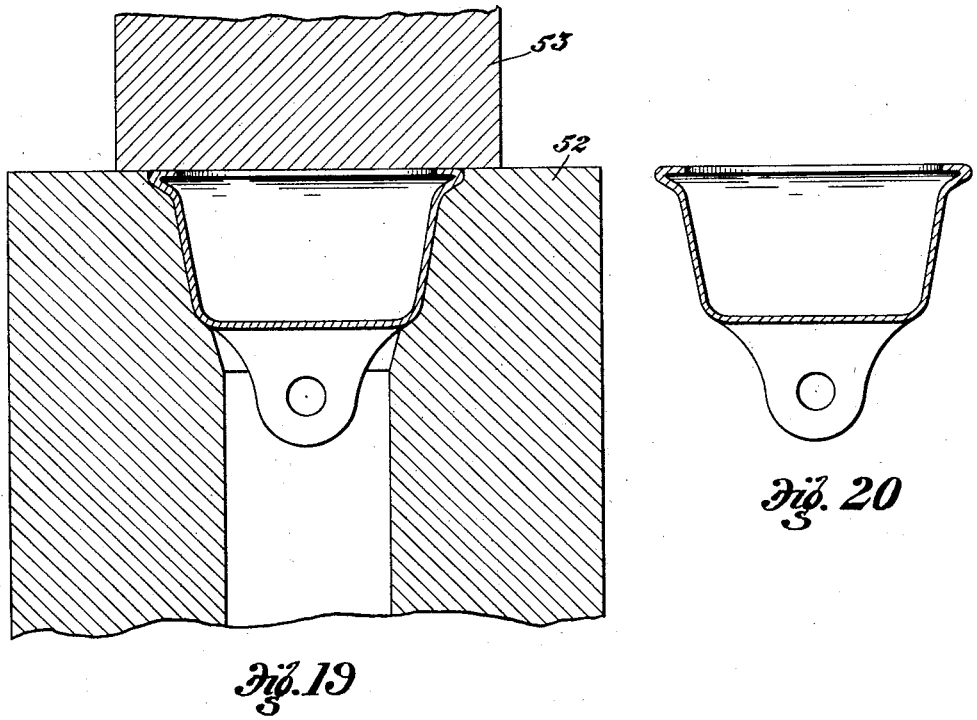

Figure 1 is a side elevation of an insulator, showing its head and cap in section;

Fig. 2, a perspective view of a blank bar from which two caps may be made;

Fig. 3, a fragmentary section of blocking die and punch blocks, showing edge dies therein;

Fig. 4, a side elevation of the blank form;

Fig. 5, a section of the blocking die and punch through the axis thereof, showing the first formation of the cup and ear lug;

Fig. 6, a detached view of a pair of cups blocked from the blank form;

Fig. 7, a plan of the blocking die;

Fig. 8, a section of the finishing forging die and punch through the axis thereof;

Fig. 9, a section of a pair of cups with offset rims and ear lugs, as forged in the finishing dies;

Fig. 10, a section of the finishing die and punch blocks through the indenting edger dies;

Fig. 11, a fragmentary side view of a cup showing the ear lug thereon;

Fig. 12, a similar view showing the indenture in the ear lug;

Figs. 13 and 14, similar side and edge views of the ear lug, showing the method of cutting the same to form spaced apertured ears from the indented lug;

Fig. 15, a similar view showing the apertured ears in section;

Fig. 16, a section of a die and punch for inwardly bending or closing the rim flange;

Figs. 17 and 18, are sections of the forged cup before and after the inward bending or closing of the rim flange;

Fig. 19, a section of a die and ram for flattening the inwardly bent flange; and Fig. 20, a section of the completed cap.

Similar numerals refer to similar parts throughout the drawings.

The cap 21 for the head 22 of an insulator 23 may be provided with a pair of spaced apertured ears 24 for a supporting connection, and is preferably provided with a reversely curved rim 25 forming an annular recess 26, for positively engaging the cement 27 used for securing the head of the insulator within the cap.

Such a cap may be made by forging from a blank bar 28, by the use of edger dies 29 to break down the bar, into the blank form 30 for blocking a cup; and as shown in Fig. 4, it is convenient to break down a blank bar into two blank forms for blocking two cups with a connecting neck 31 between them.

The blocking die 32 and punch 33 are then used to roughly shape a cup 34 and extrude an ear lug 35 therefrom, as shown in Fig. 5; the same being successively done for a pair of connected cups as shown in Fig. 6. The forging formation of each cup is then made by a finishing die 36 and punch 37 as shown in Fig. 8, which shapes a slightly flared, offset flange 38 on the rim of the cup, and a final ear-lug form 39.

The finishing die and punch blocks may be provided with edger dies 40 and 40' by means of which indentations 41 may be forged into each side of the ear lug, after which the lug may be cut by a suitable tool, in a median line through the bottom of the indentation, as shown in Figs. 13 and 14, thereby completing the formation of two spaced ears 42, with corresponding apertures 43 therein resulting from the indentations made in the lug; and if desired, a suitable punch or other tool may be used for finishing the formation of these apertures.

The neck connecting the forged cups, and the fin or flash around the rims, may be severed therefrom in a trimming machine; after which the offset rim 38 may be bent or closed inward by means of a die 44 and a punch 45, the die being shaped to surround and sustain the body portion 46 and the offset of the rim 47 of the cup, and the punch having a conical rim 48 for shaping and deflecting inward the edge portion 49 of the rim, and also being provided with a protruding head 50, cylindrically shaped at its base 51 to sustain the edge of the rim and tapered toward its end to fit and truly shape or press the walls of the cup within the die.

If it be desired to flatten the inwardly deflected rim to a plane perpendicular to the axis of the cup, the same may be done with a die 52 and a ram 53 as shown in Fig. 19; thus completing the formation of the cap as shown in Fig. 20. It will be understood, however, that the rim need not be thus flattened, in which event, the process may terminate with the rim bending or closing operation illustrated in Fig. 16.

I claim:—

1. The method of making an insulator cap or the like from a blank bar which includes forging a cup and extruding an ear lug on its bottom, and then bending the edge of the rim of the cup inward.

2. The method of making an insulator cap or the like from a blank bar, which includes forging a cup with an offset rim, and then bending the rim inward to form an annular recess between the edge of the rim and the offset.

3. The method of making an insulator cap or the like from a blank bar, which includes forging a cup with an offset rim and extruding an ear lug on its bottom, and then bending the rim inward to form an annular recess between the edge of the rim and the offset.

4. The method of making an insulator cap or the like from a blank bar, which includes forging a cup and extruding an ear lug on its bottom and then cutting the lug to form spaced supporting ears.

5. The method of making an insulator cap or the like from a blank bar, which includes forging a cup and extruding an ear lug on its bottom, then indenting the sides of the lug, and then cutting the lug through the bottom of the indentations to form spaced ears with apertures therein.

6. The method of making an insulator cap or the like from a blank bar, which includes forging a cup with an offset rim, then bending the rim inward to form an annular recess between the edge of the rim and the offset and at the same time compressing the walls of the cup.

CLINTON W. STOVER.